United States Patent Office 3,280,056
Patented Oct. 18, 1966

3,280,056
EPOXIDE COMPOSITIONS PREPARED FROM DIMERIC UNSATURATED HIGHER FATTY ACIDS
John E. Masters, Louisville, Ky., assignor, by mesne assignments, to Devoe & Raynolds Company, Inc., New York, N.Y., a corporation of Delaware
No Drawing. Filed June 19, 1962, Ser. No. 203,484
15 Claims. (Cl. 260—21)

This application is a continuation-in-part of Serial No. 371,420, filed July 30, 1953, now abandoned.

This invention relates to film forming epoxide terminated resins and includes new compositions and a new process for forming such resins, new compositions in which such resins are compounded with other resins, new methods of utilizing such resins, and compositions and products produced therefrom.

The new epoxide terminated resins are produced by the reaction of a dibasic, dimeric, unsaturated fatty acid, such as dilinoleic acid, with an excess of a polyepoxide at regulated temperatures around 150° C. or within the range of about 110° C. to 160° C., to effect reaction of the carboxyl groups of the dimeric acids with part of the epoxide groups of the polyepoxide to form epoxide terminated resins which contain the dimeric acid residue or nucleus as an intermediate constituent. The new epoxide resins are epoxy terminated polyether polyester derivatives.

The reaction of the carboxylic acid groups of the dimeric unsaturated acids with epoxide groups of the polyepoxides is a direct addition reaction between the epoxide group and the carboxyl group. And the new epoxide terminated resins, when made with diepoxides, are mainly or largely straight chain reaction products of unusually high molecular weight which combine in the same molecule the dimeric acid residues and the epoxide residues.

The dimeric unsaturated acids used in making the new resins are dibasic acids such as are obtained by the dimerization of linoleic acid which is widely available in soya, cottonseed, corn and linseed oils of commerce. The preparation of such dimeric acids is described, for example, in U.S. Patent 2,482,761. A typical dimeric acid is dilinoleic acid having the general formula

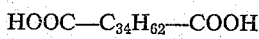
HOOC—$C_{34}H_{62}$—COOH which may be admixed with small amounts of monomeric and trimeric acids. In the dimerization of linoleic acid, part of the double bonds react to join the two hydrocarbon radicals of the acids to form a dimeric acid which still contains double bonds in a large molecule having two carboxylic acid groups. Commercial dimeric linoleic acid has a molecular weight of around 600.

The polyepoxides which are reacted in excess with the dimeric acids include both aliphatic polyepoxides and polyepoxides which are polyether derivatives of dihydric phenols such as result from the action of a dihydric phenol with an excess of epichlorhydrin in an alkaline medium.

Among the aliphatic polyepoxides which can be employed for reaction with the dimeric acids are butadiene diepoxide, p,p'-diepoxy benzene, 4-vinyl cyclohexene diepoxide, diglycid ether, and polyepoxides such as are described in U.S. Patents Nos. 2,538,072 and 2,581,464, which are polyether polyepoxides derived from polyhydric alcohols and containing intermediate halogen as well as terminal epoxide groups.

An advantageous type of polyepoxide for reaction with the dimeric acids is the type prepared from dihydric phenols by reaction with an excess of epichlorhydrin in an alkaline medium to form epoxide terminated polyether derivatives of dihydric phenols including monomeric and polymeric derivatives. One of the simple polyepoxides from a dihydric phenol is the diglycid ether of a dihydric phenol. A particularly advantageous type of diepoxide is the diepoxide or polyepoxide derived from bisphenol (p,p'-dihydroxy diphenyl dimethyl methane).

Where such polyepoxides are made by the reaction of 1 mol of dihydric phenol with less than 2 mols of epichlorhydrin in an alkaline medium, the products are epoxide resins of a polymeric character with terminal epoxide groups.

The polyepoxides will in general contain two or more epoxide groups. They may be admixed with smaller and varying amounts of monoepoxides. To the extent that monoepoxides are present, they will react with the dimeric unsaturated acids to form terminal groups or residues containing hydroxyl groups, and to the extent that such terminal hydroxyl groups are present, the complex polyepoxide compositions will contain complex epoxy-hydroxy compounds containing both terminal epoxide-containing residues and terminal hydroxyl-containing residues. The presence of monoepoxides or of monoepoxy-hydroxy compounds does not interfere with the production of the new products, provided a sufficient amount of polyepoxides is present to serve as polyfunctional reactants with the dimeric acids. The presence of monoepoxy hydroxyl compounds may be desirable and advantageous. During the final hardening operation and at higher temperatures, the epoxy groups in the reaction product may further react with hydroxyl groups to form more complex reaction products.

The proportions of polyepoxide and dimeric acids are such that an excess of polyepoxide is used, the polyepoxide being reacted with the acid in a mol ratio of about 4:3 to 6:3. In determining the amount of polyepoxides present for reaction with the dimeric acids, the epoxide content or epoxide equivalent of the polyepoxide product is determined and the amount equal to 2 epoxide groups is taken as representing 1 mol in determining the amount of polyepoxide to be used for reaction with the dimeric acids.

The epoxide equivalent of the polyepoxides, including resinous polyepoxides which are polyether derivatives of dihydric phenols, can be determined for practical purposes by determining the equivalent weight of the polyepoxide composition per epoxide group. The method used for determining the epoxide content of the epoxide resins hereinafter indicated was by heating 1 gram sample of the epoxide composition with an excess of pyridine containing hydrochloride (made by adding 16 cc. of concentrated hydrochloric acid per liter of pyridine) at the boiling point for 20 minutes and back titrating the excess pyridine hydrochloride with 0.1 N sodium hydroxide, using phenolphthalein as indicator, and considering that 1 HCl is equivalent to 1 epoxide group.

The polyepoxides which are advantageously used for reaction with the dimeric acids are epoxide resins produced by the reaction of a dihydric phenol with an excess of epichlorhydrin in an alkaline medium. Such polyepoxides vary somewhat in composition but may be considered to be made up largely or mainly of a diepoxide molecular structure illustrated by the following formula:

$$R_2—[O—R—O—R_1]_n—O—R—O—R_2$$

in which R is the aromatic residue of the dihydric phenol, $R_1$ is an intermediate hydroxyl-containing residue of the epichlorhydrin, and $R_2$ is mainly an epoxide containing residue. Thus, in the case of a diepoxide made from bisphenol and epichlorhydrin, $R_2$ would represent the group

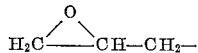

$R_1$ would be represented by the group $$—CH_2—CH(OH)—CH_2—$$

and R would be the residue of the bisphenol represented by the following group or nucleus $$—C_6H_4—C(CH_3)_2—C_6H_4—$$

In the above formula, $n$ represents the degree of polymerization. When $n$ is zero, the product is mainly a diglycid ether of a dihydric phenol. Where $n$ is 1 or more, the product is a polymeric product having both terminal epoxide groups and intermediate aliphatic hydroxyl groups.

In the reaction of the dimeric acids with the diepoxides, an excess of the diepoxide is used. When the reaction is carried out under controlled conditions, the primary reaction is one between carboxyl groups of the dimeric acid and epoxide groups of the diepoxide, which is a direct addition reaction to form ester linkages. One acid group of the dimeric acid reacts with an epoxide group of one diepoxide, and the other acid group reacts with an epoxide group of another diepoxide. And with an excess of diepoxide, there is formed a long chain epoxide terminated reaction product.

The reaction of the acid groups of the dimeric acid with the epoxide groups is a different reaction from that which takes place when acid anhydrides of dibasic acids react with diepoxides. Acid anhydride groups and epoxide groups do not directly react until the anhydride or epoxide group is opened to produce a free acid or hydroxyl group. Acid anhydrides can, however, react with alcoholic hydroxyl groups by direct addition to form esters. But when the dimeric acids are reacted with the diepoxides, under controlled conditions, the reaction is primarily one of direct reaction of acid and epoxide groups to form esters. By carrying out the reaction under controlled conditions, the formation of cross-linked products is reduced to a minimum.

The proportions of dimeric acid and of diepoxide are such that an excess of the diepoxide is used to form epoxide terminated resins, the proportion of diepoxide to dimeric acid may vary from a mol ratio of about 4:3 to 6:3, considering one acid group equivalent to 1 epoxide group.

The reaction with dimeric acid and diepoxide is a controlled reaction, carried out at a temperature sufficiently low to prevent any substantial esterification of the internal aliphatic hydroxyl groups of the diepoxide with the dimeric acid, but sufficiently high to bring about reaction between the carboxyl groups of the dimeric acid and the terminal epoxide groups of the diepoxide. Thus, where a dimeric acid having the formula $$HOOC—R_3—COOH$$

where $R_3$ is, for example, $C_{34}H_{62}$, as in the case of dilinoleic acid, is reacted in the proportion of 1 mol of the dimeric acid with 2 mols of the diepoxide, using the diepoxide having the following formula $$R_2—[O—R—O—R_1]_n—O—R—O—R_2$$

as above explained, the resulting epoxide terminated resin is mainly a long chain product such as illustrated by the following formula $$R_2—[O—R—O—R_1]_n—O—R—O—R_1—O—CO—R_3$$
$$—CO—O—R_1—O—R—O—[R_1—O—R—O]_n—R_2$$

in which R, $R_1$, $R_2$ and $R_3$ have the meaning illustrated above.

From the above formula, it will be seen that the reaction of the original diepoxide with the dimeric acid results in producing a long chain compound with the dimeric acid residue content as an intermediate group, between the residues of the diepoxides, while the high molecular weight long chain reaction product is an epoxide terminated resin of unusually high molecular weight and with desirable properties imparted by the intermediate dimeric acid residues which give a desirable oil-modifying property to the epoxide resins.

In the reaction of the dimeric acids with the diepoxides, the reaction is carried out under conditions to promote the reaction between carboxyl groups and terminal epoxide groups, but to minimize or prevent reaction of intermediate aliphatic hydroxyl groups of the diepoxide with the acid. The process is desirably carried out by heating to around 150° C., with agitation, until the reaction product has an acid value of around 7 or less. Temperatures as low as 110° C. or somewhat lower can be used in some cases, and also temperatures as high as around 161° C. or somewhat higher can be used, but the temperature and time should be controlled to avoid undesirable side reactions such as excessive cross-linking or reaction of intermediate hydroxyl groups. Products having a somewhat higher acid value than 7 are in some cases desirable products. With some of the diepoxides, a simple admixture of the dimeric acids and heating without a solvent is sufficient. In some cases, it is desirable to use small and varying amounts of solvents to promote the reaction and to keep the reacting materials and reaction products in a fluid state or in solution. Thus, with high melting diepoxides, and in reacting large batches of the materials, it has been found advantageous to add to the reaction mixture around e.g. 25% of solvent. The addition of such solvent enables more uniform agitation to be obtained, and there is less danger of the product forming a gel before the desired qualities are obtained. Solvents which may be employed for this purpose are those such as Cellosolve acetate, xylene, Hi-Flash naphtha, etc. The solvent should not contain a reactive group which would, under conditions of the process, react with the epoxide or carboxyl groups.

The epoxide terminated resin compositions produced by the reaction of dimeric acids and diepoxides are valuable film-forming compositions or products. Solutions of such epoxide terminated resins can thus be used with small amounts of amine catalysts or compounded with urea formaldehyde resins as converters to form films which, when baked, have desirable properties of flexibility, toughness, mar resistance, and water and acetone resistance.

The new epoxide terminated resins and compositions made therefrom are of value for use as coatings, both clear and pigmented, for metal, glass, wood, etc. They are also valuable as plasticizers for nitrocellulose lacquers.

The new epoxide terminated resins are characterized by improved solubility in aromatic solvents, as compared with epoxide resins produced from dihydric phenols and epichlorhydrin in the presence of caustic alkali. Some of the new epoxide terminated resins are compatible with as much as 90% aromatic solvent and 10% lacquer type solvent (ketones, esters, Cellosolves, etc.) at 35% solids.

When the proportion of dimeric acid is equivalent to the diepoxide used, that is, where the acid groups of the dimeric acids and the epoxide groups of the diepoxides are substantially equal, the products, if the reaction is carried to completion, are not epoxide terminated resins, although they give products which are desirable for making fibers. In order to produce the epoxide terminated resins of this invention, the proportion of mols of diepoxides to dimeric acid should be between about 4:3 to 6:3 as stated above.

Advantageously, catalysts may be employed in reacting the polyepoxides with the dimeric acids. Quaternary ammonium compounds such as benzyl trimethyl ammonium chloride are preferred, although the other well known compounds capable of catalyzing an epoxy-carboxy reaction can also be used such as pyridine, piperidine, benzyl trimethyl ammonium acetate, etc.

The new epoxide terminated resins, because of their terminal epoxide groups and intermediate aliphatic hydroxyl groups, are capable of reaction, particularly with a catalyst, such as an alkaline catalyst, to form final insoluble infusible reaction products. They can be used alone with such a catalyst, for example in solution as a film forming composition, which is hardened by baking. The new epoxide resins can also advantageously be compounded with other resins in varying proportions, including phenol-formaldehyde resins, ureaformaldehyde resins, melamine-formaldehyde resins, etc.

Particularly valuable products are obtained in some cases with the use of ureaformaldehyde resins, including butylated urea-formaldehyde resins. With such resins, it is advantageous also to use a small amount of a catalyst.

The invention will be further illustrated by the following specific examples, but it will be understood that the invention is not limited thereto. In the examples the diepoxide, unless otherwise identified, is an epoxide resin produced by the reaction of bisphenol with an excess of epichlorhydrin in the presence of an alkaline medium and with a melting point and weight per epoxide of the resin indicated.

The amount of resin considered as a diepoxide, from the standpoint of determining molecular ratios, is the amount of resin corresponding to 2 epoxide groups.

In the following examples, the dimeric unsaturated acids, referred to as dimer acids, were the dimerized linoleic acid product marketed by Emery Industries under the designation 955 dimer acid having an iodine value of around 80–95, an acid value of around 180–192, a saponification value of around 185–195, and a neutralization equivalent of around 290–310, and being mainly the dimeric acid with small amounts of monomeric and trimeric constituents.

In the following examples, the urea-formaldehyde resin referred to was a solution of urea-formaldehyde resin in butanolxylol having a solids content of 60% by weight, a butanol content of 30% by weight, a xylol content of 10% by weight, a viscosity (Gardner-Holdt) of S–V, a solids acid number of 0.5–2.0 and an approximately weight per gallon of 8.5 lbs. [see Zimmerman et al., "Handbook of Material Trade Names" (Dover, New Hampshire, Industrial Research Service, 1953), at page 80], a product marketed by the American Cyanamid Company under the trade name "Beetle 216-8," and the catalyst referred to in the composition containing such resin was the morpholine salt of paratoluene sulfonic acid. In the examples, the parts are by weight, and the amount of catalyst is based on the total weight of resins.

*Example 1.*—212 parts of an epoxide resin having a weight per epoxide of 369 and a melting point of 50° C. and 88.0 parts dimer acids (ratio of 2 mols resin:1 mol dimer acids) were placed in a vessel equipped with agitator, thermometer and condenser and heated at 147°–150° C. for 2 hours when the reaction mixture had an acid value of 8.5. 150 parts xylene were added to thin the mixture to 68.0% solids. The reaction product had a weight per epoxide of 1547–1567.

3 mil films were baked 30 minutes at 150° C. with 10% urea-formaldehyde resin and 1% catalyst, 15% urea-formaldehyde resin and 1% catalyst, and 20% urea-formaldehyde resin and 1% catalyst. The 15% urea-formaldehyde resin film was the best, showing excellent flexibility and toughness. The 20% film was the hardest, but was somewhat brittle.

A resin similarly produced and having a weight per epoxide of 1360 was tested for cap coating. 10% urea-formaldehyde and 1% catalyst were added to a 30% solution of the product and caps pressed and bake 10, 20 and 30 minutes at 400° F. All caps showed excellent flexibility and resistance to boiling water. The longer bake time gave slightly better flexibility.

Tin plates similarly coated with such solution, and also with solutions containing 15% urea-formaldehyde resin and 1% catalyst, and baked 10, 20 and 30 minutes at 400° F., showed excellent resistance to breaking of the film when the plates were bent.

*Example 2.*—193.2 parts of an epoxide resin having a weight per epoxide of 369 and a melting point of 50° C. and 106.8 parts dimer acid (ratio of 3 mols resin:2 mols dimer acids) were placed in a vessel equipped with agitator, thermometer and side arm condenser and heated at 135°–150° C. for 2 hours when the reaction mixture started to gel. 150 parts xylene were added. The reaction product had an acid value of approximately 16 and a weight per epoxide of 2855–2979.

3 mil films braked 30 minutes at 150° C. with 10% urea-formaldehyde resin and 1% catalyst, 15% urea-formaldehyde resin and 1% catalyst, and 20% urea-formaldehyde resin and 1% catalyst were softened somewhat by acetone. The 15% urea-formaldehyde resin film was best and showed excellent flexibility. The 20% urea-formaldehyde resin film was somewhat brittle.

*Example 3.*—193.2 parts of an epoxide resin having a weight per epoxide of 369 and a melting point of 50° C., 106.8 parts dimer acid and 100.0 parts xylene (ratio of 3 mols resin:2 mols dimer acid) were placed in a vessel equipped with agitator, thermometer and side arm condenser and heated at 148°–150° C. for 2¾ hours when the reaction mixture became very, very viscous and started foaming. 100 parts xylene were added. The reaction product had an acid value of less than 5 and a weight per epoxide of 2787–2840.

3 mil films baked 30 minutes at 150° C. with 10% urea-formaldehyde resin and 1% catalyst, 15% urea-formaldehyde resin and 1% catalyst, and 20% urea-formaldehyde resin and 1% catalyst showed no yellowing. The 10 and 15% films showed excellent flexibility. The 20% film was brittle. The 15 and 20% solutions gelled after 15 days at room temperature. The 10% solution gelled after 30 days at room temperature.

Solubility tests showed that this resin requires 11.2% Cellosolve acetate and 88.8% xylene to reduce to 35% solids.

*Example 4.*—1288 parts of an epoxide resin having a weight per epoxide of 369 and a melting point of 50° C., 712 parts dimer acids and 857 parts Hi-Flash naphtha (ratio of 3 mols resin:2 mols dimer acid) were placed in a vessel equipped with agitator, reflux condenser, and thermometer and heated at 145°–153° C. for 10¾ hours, when the reaction mixture had an acid value of approximately 15. 825 parts xylene were added. The reaction product had a weight per epoxide of 2500 and a color of 10–11 and viscosity of $Z_4$–$Z_5$ at 50% solids in 68% xylene and 32% Hi-Flash naphtha.

Solubility tests showed this resin to be soluble at 50% solids in 68% xylene and 32% Hi-Flash naphtha, and at 30% solids in 70% xylene, 20% Hi-Flash naphtha and 10% Cellosolve acetate.

10% urea-formaldehyde resin and 1% catalyst were added to a 30% solution of the resin and metal caps pressed and baked 10, 20 and 30 minutes at 400° F. The caps showed no blushing or lifting after 1 hour in boiling water.

Tin plates similarly coated with such solution, and also with solutions containing 15% urea-formaldehyde resin and 1% catalyst, and baked 10, 20 and 30 minutes at 400° F., showed excellent resistance to breaking of the film when the plates were bent.

Such solutions can advantageously be blended with alkyd resins. Thus, when a 30% solution of the resin was admixed with 15% urea-formaldehyde resin and 1% catalyst based on the resin solids, and a 40% soya bean oil modified glycerolphthalate alkyd resin added thereto, compositions were produced which were desirable film-forming compositions. An admixture of 1 part such alkyd resin with 2 parts of the product, baked 30 minutes at 150° C. as a 3 mil film on glass, gave a soft, clear film of good flexibility and fair mar resistance.

*Example 5.*—239.5 parts of an epoxide resin having a weight per epoxide of 606 and a melting point of 81° C., 60.5 parts dimer acids and 100 parts xylene (ratio of 2 mols resin:1 mol dimer acid) were placed in a vessel equipped with agitator, thermometer, and side arm condenser and heated at 140°–150° C. for 5 hours when the reaction mixture had an acid value less than 5. The reaction product had a weight per epoxide of 1676.

Solubility tests showed the product to be compatible at 35% solids with 18.2% Cellosolve acetate and 81.8% xylene.

A 3 mil film with 10% urea-formaldehyde resin and 1% catalyst drawn on glass and baked 15 minutes at 200° C. showed no yellowing, excellent flexibility and good acetone resistance.

*Example 6.*—A product prepared as described in the preceding example, having an acid value of about 4.7 and a weight per epoxide of 1580, gave the following test results:

Solubility tests showed the resin to be incompatible at 35% solids with (1) 40% xylene, 40% Hi-Flash naphtha, 20% Cellosolve acetate, (2) 45% xylene, 35% Hi-Flash naphtha, 20% Cellosolve acetate, and (3) 50% xylene, 30% Hi-Flash naphtha, 20% Cellosolve acetate. The resin was compatible at 35% solids with 55% xylene, 25% Hi-Flash naphtha and 20% Cellosolve acetate.

10% urea-formaldehyde resin and 1% catalyst were added to a 35.6% solution of the product and metal caps pressed and baked 10, 20, 30 minutes at 400° F. The coated films showed no lifting or blushing in boiling water after 1 hour. The 30 minute bake was somewhat better than the others.

Tin plates rolled with the above solution and baked 10, 20, 30 minutes at 400° F. showed excellent resistance to breaking of the films when the plates were bent, as did also plates similarly coated with a similar solution to which 15% urea-formaldehyde resin and 1% catalyst were added.

*Example 7.*—374.1 parts of an epoxide resin having a weight per epoxide of 606 and a melting point of 81° C., 126.0 parts dimer acids, and 167 parts xylene (ratio of 3 mols resin:2 mols dimer acids) were placed in a vessel equipped with agitator, thermometer, and side arm condenser, and heated at 149° C. for 3¾ hours when the reaction mixture had an acid value of less than 6. 100 parts xylene was added to the reaction mixture. The reaction product had a weight per epoxide of 2569–2577.

Solubility tests showed that the product is compatible at 35% solids with 20% Cellosolve acetate and 80% xylene.

A 3 mil film with 10% urea-formaldehyde resin and 1% catalyst drawn on glass and baked 15 minutes at 200° C. showed excellent flexibility but was somewhat soft.

A 3 mil film with 15% urea-formaldehyde resin and 1% catalyst drawn on glass and baked 30 minutes at 150° C. showed no yellowing, slight toughness and flexibility. A 15 minute at 200° C. film showed the same characteristics.

Tests on metal caps and wedge bends on tin plates gave excellent results.

*Example 8.*—431.4 parts of an epoxide resin having a weight per epoxide of 962 and a melting point of 98° C., 68.9 parts dimer acids and 167.0 parts xylene (ratio of 2 mols resin:1 mol dimer acids) were placed in a vessel equipped with agitator, thermometer, and side arm condenser and heated at 147°–148° C. for 4 hours when the reaction product had an acid value of slightly less than 6. The reaction product had a weight per epoxide of 2300–2333.

Solubility tests showed the product to be compatible at 35% solids with 30–35% Cellosolve acetate and 70–65% xylene.

A 3 mil film with 10% urea-formaldehyde resin and 1% catalyst drawn on glass and baked 15 minutes at 200° C. showed excellent flexibility, softness, and fair acetone resistance.

A 3 mil film with 15% urea-formaldehyde resin and 1% catalyst drawn on glass and baked 30 minutes at 150° C. showed no yellowing, fair flexibility and no acetone resistance. A film of this same solution baked 15 minutes at 200° C. showed similar properties.

*Example 9.*—412.5 parts of an epoxide resin having a weight per epoxide of 962 and a melting point of 98° C., 87.5 parts dimer acids and 167.0 parts xylene (ratio of 3 mols resin:2 mols dimer acids) were placed in a vessel equipped with agitator, thermometer, and side arm condenser and heated at 146–148° C. for 5¾ hours, when the reaction mixture had an acid value of less than 5. 100 parts xylene were added to the reaction mixture. The reaction product had a weight per epoxide of 3160.

A 3 mil film with 10% urea-formaldehyde resin and 1% catalyst drawn on glass and baked 30 minutes at 150° C. showed excellent flexibility, toughness, and no acetone resistance.

A 3 mil film with 15% urea-formaldehyde resin and 1% catalyst drawn on glass and baked 30 minutes at 150° C. showed excellent flexibility, toughness, and some acetone resistance.

A 3 mil film with 20% urea-formaldehyde resin and 1% catalyst drawn on glass and baked 30 minutes at 150° C. showed good acetone resistance but poor flexibility, toughness, and mar resistance.

*Example 10.*—458.7 parts of an epoxide resin having a weight per epoxide of 1700 and a melting point of 128° C., 41.3 parts dimer acids and 167.0 parts Cellosolve acetate (ratio of 2 mols resin:1 mol dimer acids) were placed in a vessel equipped with agitator, thermometer and reflux condenser and heated at 148°–151° C. for 11 hours when the reaction mixture had an acid value of slightly less than 2. 100 parts Cellosolve acetate was added to the reaction mixture. The reaction product had a weight per epoxide of 5397–5613.

Solubility tests show that the product is compatible with 47% xylene and 53% Cellosolve acetate at 35% solids.

A 3 mil film with 10% urea-formaldehyde resin and 1% catalyst drawn on glass and baked 30 minutes at 150° C. showed excellent flexibility, toughness and no acetone resistance.

A 3 mil film with 15% urea-formaldehyde resin and 1% catalyst drawn on glass and baked 30 minutes at 150° C. showed good to excellent flexibility, and resistance to acetone.

A 3 mil film with 20% urea-formaldehyde resin and 1% catalyst drawn on glass and baked 30 minutes at 150° C. showed good acetone resistance and some brittleness.

*Example 11.*—A diepoxide resin having a weight per epoxide of 944 was prepared by reacting in an alkaline medium 1.125 mols epichlorohydrin with 0.750 mol of a dihydric phenol compound prepared by reacting 25 mols bisphenol with 12.5 mols dichlorethyl ether in an alkaline medium.

248.9 parts of a 94.0% solution of the above resin in xylene and 51.1 parts dimer acids (ratio of 3 mols diepoxide:2 mols dimer acids) were placed in a vessel equipped with thermometer, agitator and reflux condenser. The reaction mixture was heated to 111° C. and 34 parts xylene added. The reaction mixture was then heated to reflux at 148° C. and held at 148–151° C. for 7 hours. The reaction product was cooled and 100 parts xylene added.

The product had an acid value of 20.4 and a weight per epoxide of 2104. A 50% solution of the product in xylene had a viscosity of M-N and a color of 11–12. This product was compatible at 34.8% solids in xylene and at 66.7% solids in mineral spirits.

20% urea-formaldehyde resin and 1% catalyst based on resin solids were added to a 50% solution of the product. A 3 mil film was drawn on glass and baked 30 minutes at 150° C. The film showed excellent flexibility, toughness, hardness and mar-resistance.

*Example 12.*—A diepoxide resin having a weight per epoxide of 1314 and a melting point of 63° C. was prepared by reacting in an alkaline medium 5.25 mols epichlorohydrin with all of the neutral reaction product solution from the reaction in an alkaline medium of 7.50 mols bisphenol with 5.00 mols dichlorethyl ether.

259.7 parts of the above resin, 40.3 parts dimer acids and 100 parts xylene (ratio of 3 mols diepoxide:2 mols dimer acids) were placed in a vessel equipped with thermometer, agitator, and reflux condenser. The reaction mixture was heated to refluxing at 150° C. and held at 150–151° C. for 10½ hours. The reaction mixture was cooled and 100 parts xylene added.

The reaction product had an acid value of 3.74 and a weight per epoxide of 3028. A 57.8% solution of the product in xylene had a viscosity of Q-R and a color of 10–11. This product was compatible at 14–15% solids in xylene.

20% urea-formaldehyde resin and 1% catalyst based on resin solids were added to a 57.8% solution of the product. A 3 mil film was drawn on glass and baked 30 minutes at 150° C. The film showed excellent flexibility, very good mar-proofness, toughness and hardness.

*Example 13.*—A diepoxide resin have a weight per epoxide of 540 and a melting point of 124° C. was prepared by reacting 2 mols bisphenol-S (a mixture of p,p'- and o,p'-dihydroxy diphenyl sulfones) and 3 mols epichlorohydrin in an alkaline medium.

231.2 parts of the above resin, 68.7 parts dimer acids, and 100 parts cyclohexanone (ratio of 2 mols diepoxide resin:1 mol dimer acid) were placed in a vessel equipped with thermometer, agitator and reflux condenser. The reaction mixture was heated to 155° C. and held at 155°–170° C. for 2¾ hrs. The reaction mixture was cooled and 150 parts cyclohexanone added.

The reaction product had an acid value of 0.54 and a weight per epoxide of 2382–2399. A 40% solution of the product in cyclohexanone had a viscosity of Q-R and a color of 11–12.

15% urea-formaldehyde resin and 1% catalyst based on resin solids were added to a 33.3% solution of the product. A 3 mil film was drawn on glass and baked 30 minutes at 150° C. The film showed outstanding hardness, mar resistance and flexibility.

In a similar manner, other polyepoxides and epoxide resins can be used with the dimeric unsaturated acids and also other dimeric unsaturated acids can be used. Thus, when aliphatic diepoxides such as those above referred to are reacted with the dimeric unsaturated acids, at temperatures around 150° C. or between 110° and 160° C., epoxide terminated resins can be obtained with the use of e.g. 2 mols of diepoxide to 1 mol of dimeric acids, 3 mols of diepoxide to 2 mols of dimeric acids, etc. The use of an amount of aliphatic diepoxide in excess of that equivalent to the dimeric acids would give epoxide terminated resins containing 1 or more intermediate residues of the dimeric acids joined through ester linkages with the terminal, or intermediate and terminal, epoxide radicals or residues.

I claim:
1. The method of forming epoxide terminated resins which comprises reacting a dimeric unsaturated higher fatty acid with an excess of a polyepoxide having a plurality of epoxide groups to effect reaction of carboxylic acid groups of the dimeric acid with only part of the epoxide groups of the polyepoxides at temperatures within the range of around 110–160° C. to form a resin containing reactive epoxide groups, the polyepoxide being reacted with the acid in the ratio of about 4:3 mols to 6:3 mols.

2. The process according to claim 1 in which the polyepoxide is an aliphatic diepoxide.

3. The process according to claim 1 in which the reaction takes place in the presence of a catalyst.

4. The process according to claim 1 in which the polyepoxide is an epoxide resin resulting from the reaction of a dihydric phenol with an excess of epichlorohydrin in an alkaline medium.

5. A composition adapted on reaction to form epoxide terminated resins comprising a dimeric unsaturated higher fatty acid and a polyepoxide having a plurality of epoxide groups, the proportion of polyepoxide to the dimeric acid being from about 4:3 mols to 6:3 mols.

6. A composition as defined in claim 5 in which the polyepoxide is an aliphatic diepoxide.

7. A composition as defined in claim 5 in which the polyepoxide is the reaction product of a dihydric phenol with an excess of epichlorohydrin in the presence of caustic alkali.

8. An epoxide terminated resin which is the reaction product of a dimeric unsaturated higher fatty acid with an excess of a polyepoxide having a plurality of epoxide groups, the polyepoxide being reacted with the acid in the ratio of 4:3 mols to 6:3 mols.

9. The epoxide terminated resin of claim 8 in which the polyepoxide is an aliphatic polyepoxide.

10. The epoxide terminated resin of claim 8 in which the reaction takes place in the presence of a catalyst.

11. An epoxide terminated resin which is the reaction product of a dimeric unsaturated higher fatty acid with an excess of an epoxide resin resulting from the reaction of a dihydric phenol with an excess of epichlorohydrin in an alkaline medium, the epoxide resin being reacted with the acid in the ratio of about 4:3 mols to 6:3 mols.

12. A coating composition containing the epoxide terminated resin of claim 8, together with a smaller amount of a urea-formaldehyde resin.

13. A coating composition containing the epoxide terminated resin of claim 9, together with a smaller amount of a urea-formaldehyde resin.

14. A coating composition containing the epoxide terminated resin of claim 10, together with a smaller amount of a urea-formaldehyde resin.

15. A coating composition containing the epoxide terminated resin of claim 11, together with a smaller amount of a urea-formaldehyde resin.

References Cited by the Examiner

UNITED STATES PATENTS

| | | | |
|---|---|---|---|
| 2,631,138 | 3/1953 | Dannenberg | 260—47 |
| 2,712,535 | 7/1955 | Fisch | 260—18 |
| 2,940,986 | 6/1960 | Newey | 260—18 |
| 2,970,231 | 1/1961 | Rogers et al. | 260—18 |
| 2,970,983 | 2/1961 | Newey | 260—18 |

OTHER REFERENCES

"Epon, Surface Coating Resins," Shell Chemical Corp., Technical Bulletin SC: 50–40; 20 pp., 1950.

LEON J. BERCOVITZ, *Primary Examiner.*

R. W. GRIFFIN, C. W. IVY, *Assistant Examiners.*